United States Patent
Liu et al.

(10) Patent No.: US 7,475,290 B2
(45) Date of Patent: Jan. 6, 2009

(54) DEBUGGING APPARATUS AND METHOD FOR INFORMATION STORAGE APPARATUS

(75) Inventors: He-Yao Liu, Guangdong (CN); Hung-Chih Huang, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 329 days.

(21) Appl. No.: 11/308,919

(22) Filed: May 25, 2006

(65) Prior Publication Data

US 2007/0168732 A1 Jul. 19, 2007

(30) Foreign Application Priority Data

Nov. 25, 2005 (TW) .............................. 94141532 A

(51) Int. Cl.
*G06F 11/00* (2006.01)
(52) U.S. Cl. ...................................................... 714/39
(58) Field of Classification Search ................... 714/39, 714/25, 27, 28, 30, 32, 38, 45
See application file for complete search history.

(56) References Cited

U.S. PATENT DOCUMENTS

| | | | |
|---|---|---|---|
| 5,995,993 A | 11/1999 | Liang | |
| 6,134,676 A * | 10/2000 | VanHuben et al. | 714/39 |
| 6,687,865 B1 | 2/2004 | Dervisoglu et al. | |
| 6,944,794 B2 | 9/2005 | Okabayashi et al. | |
| 6,973,593 B1 * | 12/2005 | Zani et al. | 714/31 |
| 7,251,751 B2 * | 7/2007 | Blasco Allue et al. | 714/25 |
| 2004/0168107 A1 * | 8/2004 | Sharp et al. | 714/33 |
| 2006/0129895 A1 * | 6/2006 | Shin et al. | 714/38 |

* cited by examiner

*Primary Examiner*—Nadeem Iqbal
(74) *Attorney, Agent, or Firm*—Winston Hsu

(57) ABSTRACT

A debugging apparatus is provided for debugging an information storage apparatus. The debugging apparatus includes a debugging control unit, an information converting circuit, and a computer device. The debugging control unit captures raw data and then generates a coded data sequence representing the raw data. The information converting circuit receives the coded data sequence and transforms the coded data sequence into a predetermined format. The computer device is connected to the information converting circuit, and for receiving the coded data sequence in the predetermined format and decoding the coded data sequence to the raw data.

16 Claims, 8 Drawing Sheets

| Functional Code | Category |
|---|---|
| 0x4E | database file |
| 0x68 | medium information (time, address, channel) |
| 0x6A | illustrative string |
| 0x4C | control instruction of the information storage apparatus (ATA, MMC) |
| 0x6E | user-defined instruction (ACSII, BCD, dismal friction, etc) |
| 0x67 | control codes |

FIG. 2

| Database Code | Textual Message of Working Information |
|---|---|
| C3 00 00 | DVD_RWriteIFMain--WR0MODE--0X00--start_Write_Set--DVD_MODECT= |
| C3 00 01 | DVD_RWriteIFMain--WR1MODE--0X01--Write_Process--DVD_MODECT= |
| C3 00 02 | DVD_RWriteIFMain--WR2MODE--0X02--Normal_Write_End--DVD_MODECT= |
| C3 00 03 | DVD_RWriteIFMain--WR3MODE--0X03--BP_End-to-write_Start--DVD_MODECT= |
| C3 00 04 | DVD_RWriteIFMain--WR4MODE--0X04--Error_Write_End_process--DVD_MODECT= |
| C3 00 05 | DVD_RWriteIFMain--WR5MODE--0X05--AddressRenew--DVD_MODECT= |
| C3 00 06 | DVD_RWriteIFMain--WR6MODE--0X06--DataGenerate_END--DVD_MODECT= |
| C3 00 07 | DVD_RWriteIFMain--WR7MODE--0X07--WriteData_ReceiveENDCheck--DVD_MODECT= |
| C3 00 08 | DVD_RWriteIFMain--WR8MODE--0X08--NextCmdCheck--DVD_MODECT= |

FIG. 3

DEBUGGING APPARATUS AND METHOD FOR INFORMATION STORAGE APPARATUS

FIELD OF THE INVENTION

This invention relates to debugging apparatuses and methods and, more particularly, to a debugging apparatus and method for an information storage apparatus.

DESCRIPTION OF RELATED ART

Information storage apparatuses, such as video compact disc (VCD) players and digital versatile disc (DVD) players, are widely used for reproducing information from and/or recording information onto discs. A general information storage apparatus includes one or more integrated circuit (IC) performing specific functions. For example, a servo and decode IC is employed in the information storage apparatus for performing servo control and decoding tasks. During a development stage of the storage apparatus, debugging is required and often done with logic analyzers. The logic analyzers are connected to the IC via serial ports or parallel ports to capture signals from the IC. However, the completeness and accuracy of such capturing may not reflect the actual signals within the IC, especially when the IC runs at a high speed.

In order to resolve above-mentioned deficiencies, an in-circuit emulator (ICE) is used for debugging. ICEs can pause the operation of the IC, or change the IC from a continuously executing mode into a step-by-step executing mode, so as to monitor the workings of the IC. However, ICEs are expensive, this adds extra cost to the information storage apparatus. Furthermore, because ICEs are connected to the IC via input/output (I/O) pins, a demand of I/O pins of the IC is increased.

Therefore, an improved debugging apparatus for the information storage apparatus is desired.

SUMMARY OF THE INVENTION

A debugging apparatus is provided for debugging an information storage apparatus. The debugging apparatus includes a debugging control unit, an information converting circuit, and a computer device. The debugging control unit captures raw data and then generates a coded data sequence representing the raw data. The information converting circuit receives the coded data sequence and transforms the coded data sequence into a predetermined format. The computer device is connected to the information converting circuit, and for receiving the coded data sequence in the predetermined format and decoding the coded data sequence to the raw data.

A debugging method is provided for debugging an information storage apparatus. The debugging method includes steps of: capturing raw data from the information storage apparatus; generating a coded data sequence including functional codes representing a category of the raw data and database codes representing a textual message of the raw data; transmitting the coded data sequence to an computer device; and decoding the coded data sequence to the raw data via the computer device.

Other advantages and novel features will become more apparent from the following detailed description of preferred embodiments when taken in conjunction with the accompanying drawings, in which:

BRIEF DESCRIPTION OF THE DRAWINGS

FIG. 2 is a table illustrating exemplary relationships between categories of raw data and functional codes;

FIG. 3 is a table illustrating exemplary relationships between textual messages of the raw data and database codes;

DETAILED DESCRIPTION OF THE INVENTION

Reference will now be made to the drawings to describe the preferred embodiment of the present debugging apparatus, in detail.

Figure 1:
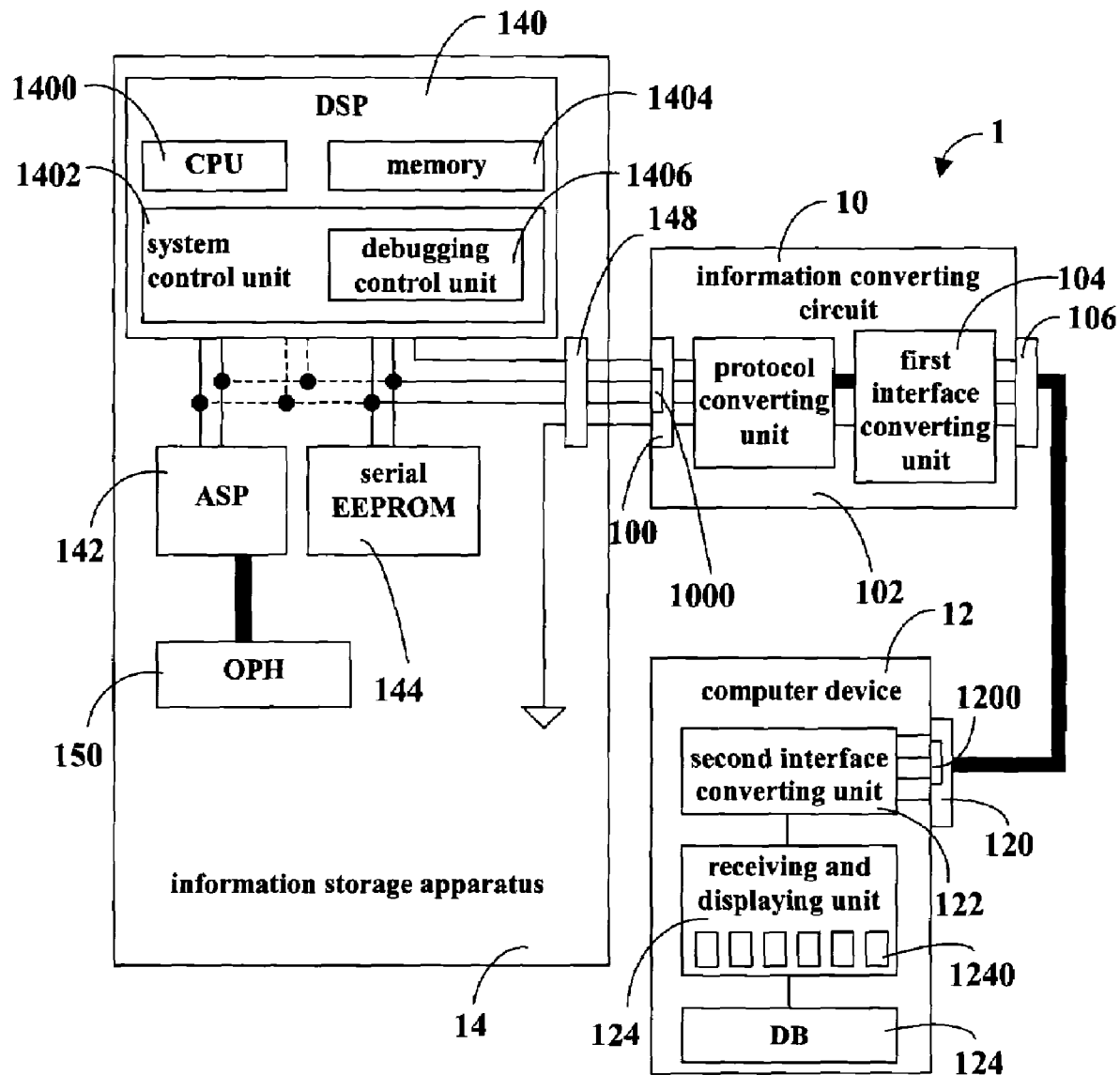
FIG. 1 is a block diagram showing an operational environment of a debugging apparatus in accordance with an exemplary embodiment, the debugging apparatus including a debugging control unit, an information converting unit, and a computer device.

Referring to FIG. 1, a block diagram showing an operational environment of a debugging apparatus 1 in accordance with an exemplary embodiment is illustrated. The debugging apparatus 1 connects to an information storage apparatus 14 and captures raw data from the information storage apparatus 14. The information storage apparatus 14 may be a VCD player, a DVD player, a super multi player, a Blu-Ray disc (BD) player, a High-Density Digital Versatile Disc (HD-DVD) player, a Video Tape Recorder (VTR), or a cam recorder.

The information storage apparatus 14 includes a digital signal processor (DSP) 140, an analog signal processor (ASP) 142, a serial electrically erasable programmable read-only memory (EEPROM) 144, an output interface 148, and an optical pickup head (OPH) 150. The OPH 150 is used for reading information from a medium (not shown) and then sending the information to the ASP 142. The ASP 142 is used for processing the information from the OPH 150 and converting the information into digital information to be sent to the DSP 140. An operation of the information storage apparatus 14 is controllable by the DSP 140 in response to the digital information. The DSP 140 communicates with the ASP 142 based on an internal serial interface (hereafter referred as to RF serial interface). The serial EEPROM 144 is used for storing a plurality of specific parameters. The specific parameters are used for correcting disc errors or servo control errors. The DSP 140 transmits a value and an address corresponding to the specific parameter to the serial EEPROM 144 based on a serial interface such as an inter-integrated circuit (I2C).

The DSP 140 includes a CPU 1400, a system control unit 1402, and a memory unit 1404 for storing a system firmware. The system control unit 1402 cooperates with the system firmware to control operations of the information storage apparatus 14.

The debugging apparatus 1 includes a debugging control unit 1406 arranged in the information storage apparatus 14, an information converting circuit 10, and a computer device 12.

The debugging control unit 1406 is used for controlling the raw data of the information storage apparatus 14 to be outputted to the information converting circuit 10. The debugging control unit 1406 is also used for classifying the raw data into different categories according to functions of the raw data, and then generating a coded data sequence representing the raw data that is then transmitted to the information converting circuit 10. The coded data sequence includes functional codes and database codes. The functional codes represent a category of the raw data. Each category of the raw data is mapped to a group of functional codes. Exemplary relationships between the categories and the functional codes are defined as in FIG. 2. The database codes represent a textual message of the raw data. Each textual message of the raw data is mapped to a group of database codes. Exemplary relationships between a textual message of the raw data and the database codes are defined as in FIG. 3. The debugging control unit 1406 is further used for generating control codes that control operations of the computer device 12.

The information converting circuit 10 is used for transforming the coded data sequence received from the output interface 148, into an interface formatted data receivable by the computer device 12. The information converting circuit 10 includes a first communicating interface 100, a protocol converting unit 102, a first interface converting unit 104, and a second communicating interface 106.

The first communicating interface 100 conforms to the output interface 148 of the information storage apparatus 14, and can be an RS232 interface, the I2C interface, or the RF serial interface. In this preferred embodiment, employment of either the I2C interface between the DSP 140 and the serial EEPROM 144 or the RF serial interface between the DSP 140 and the ASP 142, can reduce a demand of I/O pins within the DSP 142. The output interface 148 can be a user-defined interface using spare I/O pins of the DSP 140. In this instance, the first communicating interface 100 is configured to conform to the output interface 148. The first communicating interface 100 includes an output buffer 1000 for temporarily storing the coded data sequence from the output interface 148.

The protocol converting unit 102 is used for transforming the coded data sequence stored in the output buffer 1000 into input signals of the first interface converting unit 104. The input signals can be processed by the first interface converting unit 104. The protocol converting unit 102 can be a complex programmable logic device (CPLD). The protocol converting unit 102 can be modified to conform to the first communicating interface 100.

The first interface converting unit 104 is used for transforming the input signals of the first interface converting unit 104 into the interface formatted data transmittable by the second communicating interface 106.

The second communicating interface 106 can be any known communicating interface communicable with a PC, such as a USB interface, an RS232 interface, and a printer port.

The computer device 12 includes an input interface 120 corresponding to the second communicating interface 106, a second interface converting unit 122 corresponding to the first interface converting unit 104, a receiving and displaying unit 124, and a database (DB) 126. The input interface 120 conforms to the second communicating interface 106, and can be a USB interface. The input interface 120 includes an input buffer 1200 for temporarily storing the interface formatted data received from the information converting circuit 10.

The second interface converting unit 122 is used for receiving the interface formatted data stored in the input buffer 1200 and retransforming the interface formatted data back to the coded data sequence.

The receiving and displaying unit 124 is used for receiving and displaying the coded data sequence. The receiving and displaying unit 124 includes a plurality of programs 1240 for decoding the database code included in the coded data sequence to the textual message of the raw data. Each program 1240 corresponds to one category of the raw data. The receiving and displaying unit 124 invokes a corresponding program to decode the database codes included in the coded data sequence based on the functional codes included in the coded data sequence. The DB 126 is used for storing relationships between the database codes and the textual messages of the raw data.

The receiving and displaying unit 124 interprets the coded data sequence, and invokes corresponding programs 1240 to read and decode corresponding textual message of the raw data from the DB 126. For example, if the coded data sequence is "0x4E 0xC3 0x00 0x00 0x00", the corresponding raw data is "DVD_RWriteIFMain--WR0MODE--0X00--start_Write_Set--DVD_MODECT=0x00".

Figure 4:
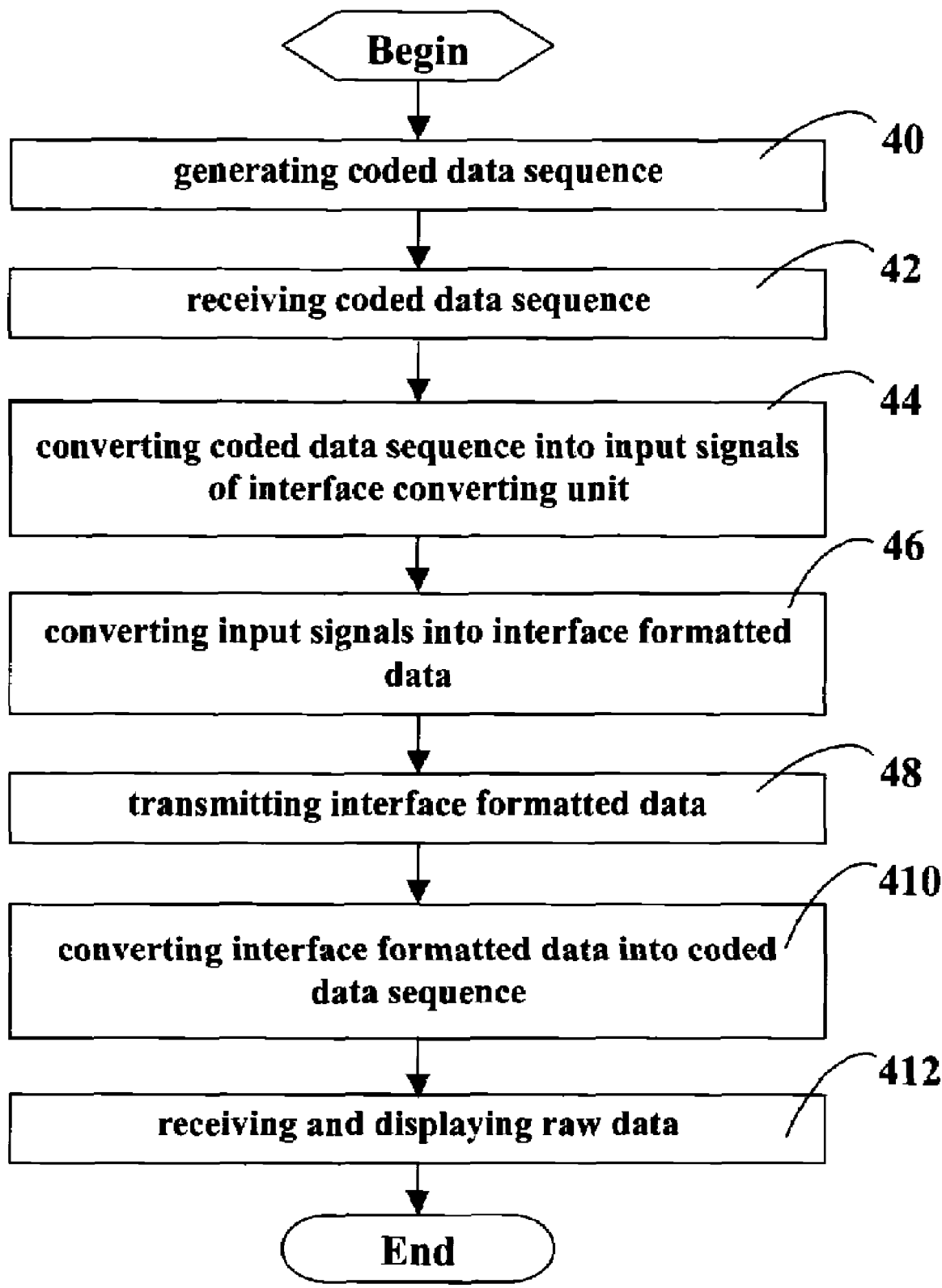
FIG. 4 is a flow chart illustrating a debugging procedure of the debugging apparatus of FIG. 1.

Referring to FIG. 4, a debugging procedure of the debugging apparatus 1 is illustrated. Firstly, in step 40, the debugging control unit 1406 generates the coded data sequence to be sent to the information converting circuit 10. Then in step 42, the protocol converting unit 102 receives the coded data sequence. In step 44, the protocol converting unit 102 transforms the coded data sequence into the input signals of the first interface converting unit 104. Then in step 46, the first interface converting unit 104 transforms the input signals of the first interface converting unit 104 into the interface formatted data transmittable by the second communicating interface 106. The interface formatted data is then transmitted to the computer device 12 via the second communicating interface 106 (step 48). Upon receiving the interface formatted data, the second interface converting unit 104 transforms the interface formatted data to the coded data sequence (step 410). Finally, in step 410, the receiving and displaying unit 120 receives and analyzes the coded data sequence and then invokes corresponding programs 1240 to obtain the original raw data to be displayed.

Figure 5:
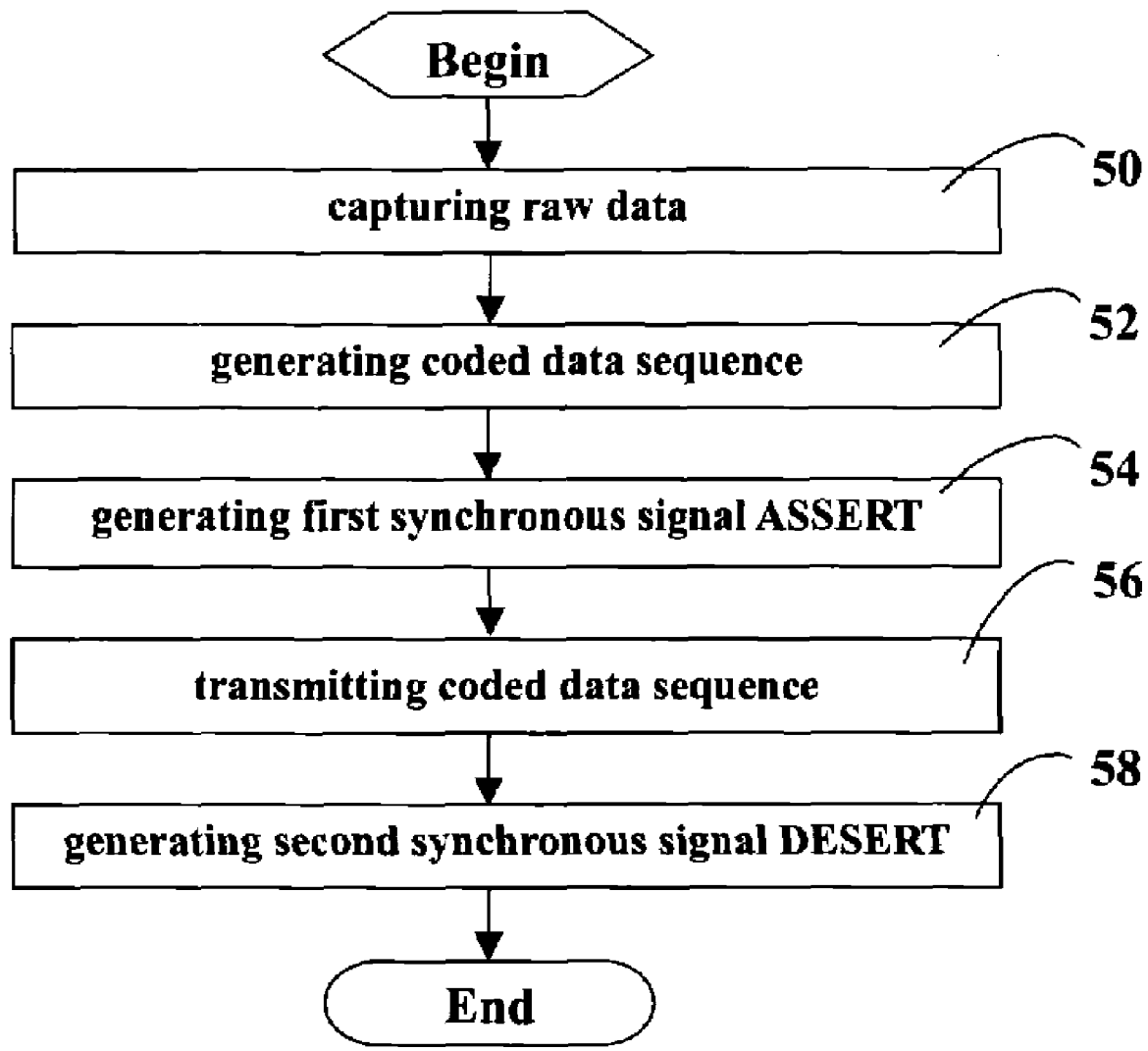
FIG. 5 is a flow chart illustrating a working procedure of the debugging control unit of FIG. 1.

Referring to FIG. 5, a working procedure of the debugging control unit 1406 is illustrated. Firstly, in step 50, the debugging control unit 1406 captures the raw data from the DSP 142. Secondly, in step 52, the debugging control unit 1406 generates the coded data sequence based on the raw data captured in step 50, the relationships between the categories of raw data and the functional codes, and the relationships between the database codes and the textual messages of raw data. Then in step 54, the debugging control unit 1406 generates a first synchronous signal ASSERT. The first synchronous signal ASSERT is used for controlling a start of information transmission from the debugging control unit 1406 to the protocol converting unit 102. The first synchronous signal ASSERT can be a switch signal between a high level and a low level. In response to the first synchronous signal ASSERT, the protocol converting unit 102 begins receiving the coded data sequence from the debugging control unit 1406 (step 56). After the transmission of the coded data sequence, the debugging control unit 1406 generates a second synchronous signal DESERT (step 58). The second synchronous signal DESERT is an opposite to the first synchronous signal ASSERT, and is used for controlling an end of the information transmission from the debugging control unit 1406 to the protocol converting unit 102. The coded data sequence between the first synchronous signal ASSERT and the following second synchronous signal DESSERT is regarded as a transmission unit. The transmission unit can include 8 bits or 16 bits data.

Figure 6:
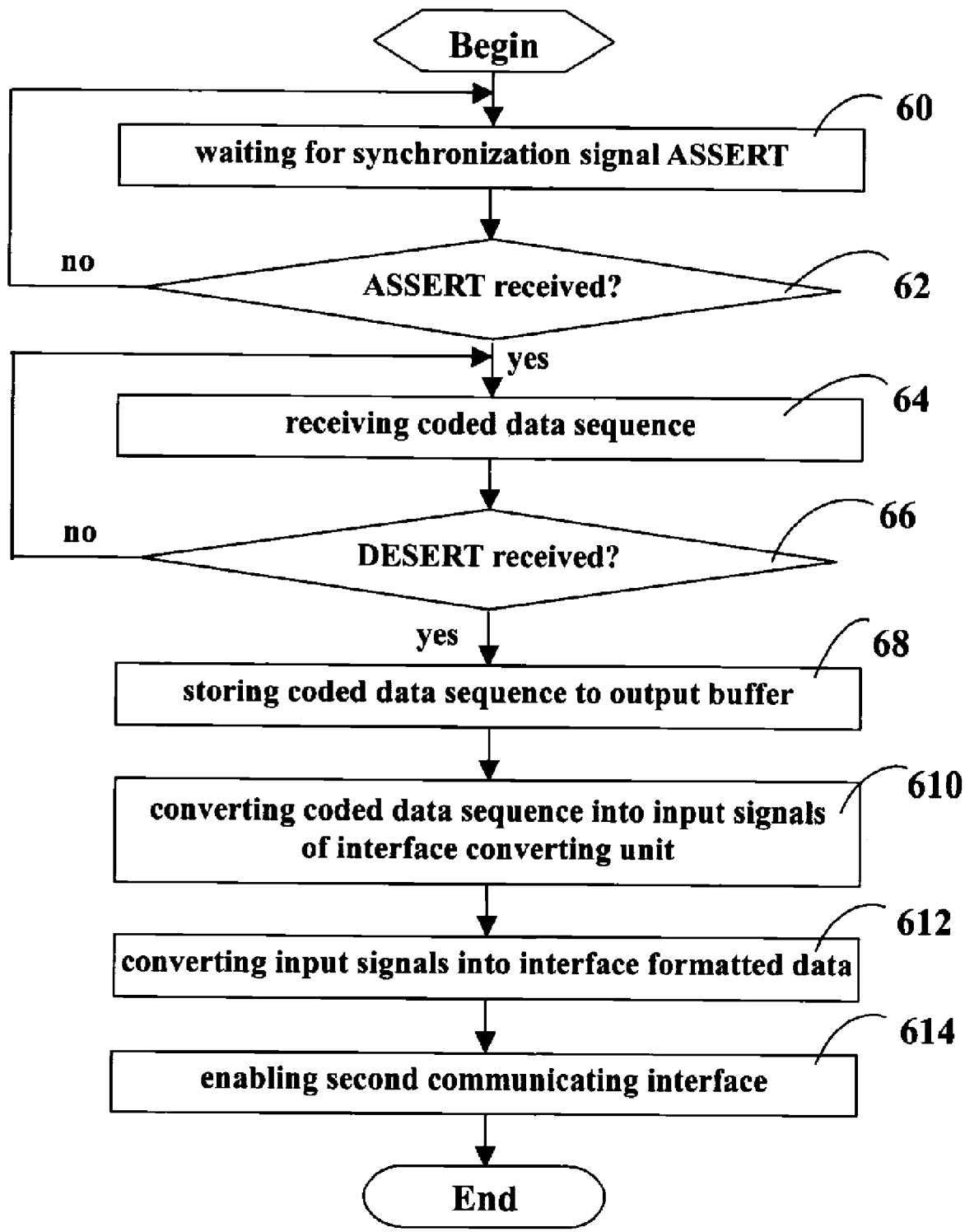
FIG. 6 is a flow chart illustrating a working procedure of the information converting unit of FIG. 1.

Referring to FIG. 6, a working procedure of the information converting unit 10 is illustrated. Firstly, in step 60, the first communicating interface 100 waits for the first synchronous signal ASSERT. Secondly, in step 62, a conclusion is made as to whether the first synchronous signal ASSERT is received. If the first synchronous signal ASSERT is received, the first communicating interface 100 receives the coded data sequence from the debugging control unit 1406 (step 64). Then in step 66, another conclusion is made as to whether the second synchronous signal DESSERT is received. If the second synchronous signal DESSERT is received, the received coded data sequence is recorded into the output buffer 1000 of the first communicating interface 100 (step 68). Then in step 610, the protocol converting unit 102 transforms the coded data sequence into the input signals for the first interface converting unit 104. After that, in step 612, the first interface converting unit 104 transforms the input signals for the first interface converting unit 104 into the interface formatted data transmittable by the second communicating interface 106. Finally, the second communicating interface is enabled to transfer the interface formatted data to the computer device 12.

Figure 7:
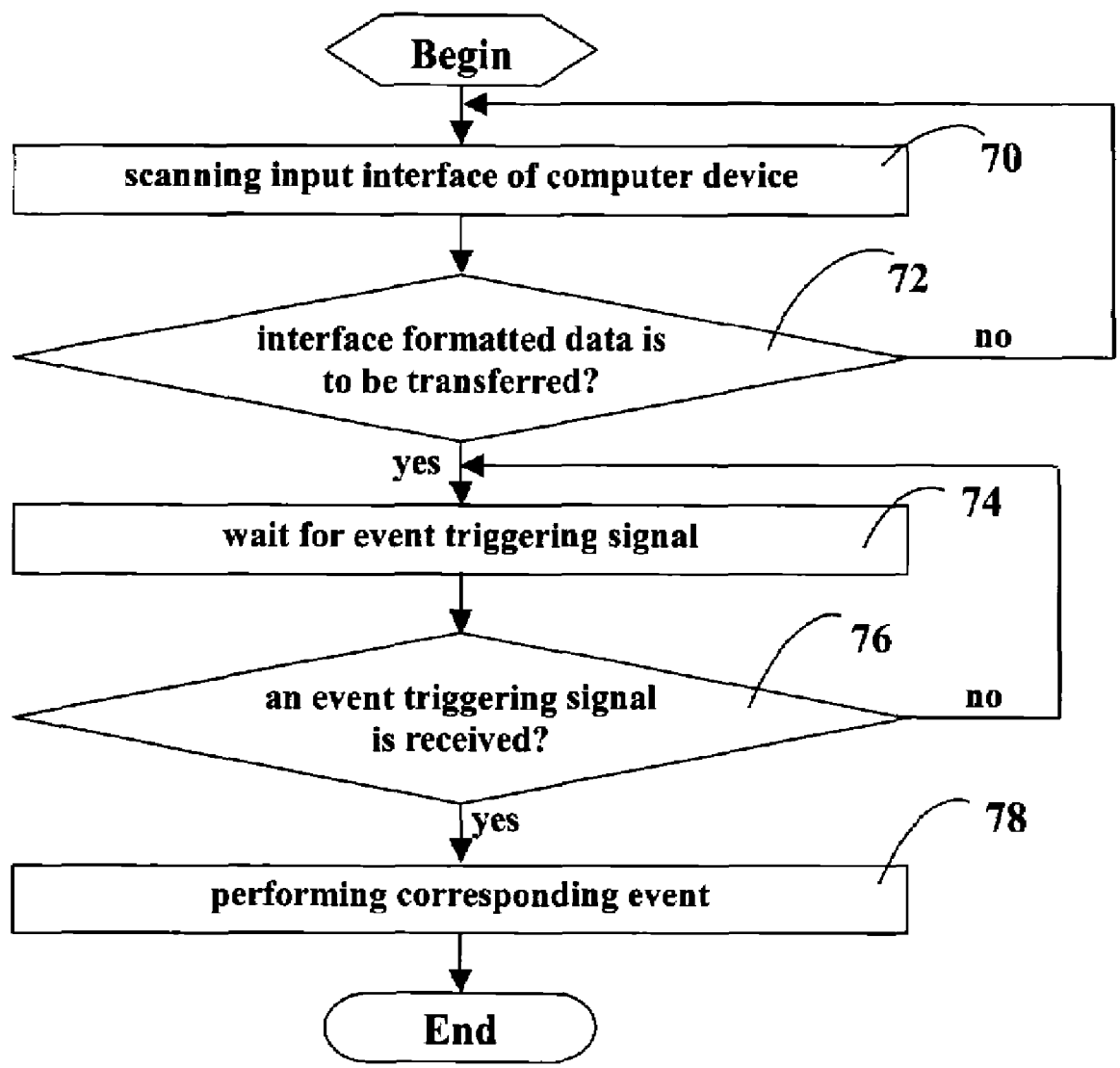
FIG. 7 is a flow chart illustrating a working procedure of the computer device of FIG. 1.

Referring to FIG. 7, a working procedure of the computer device 12 is illustrated. Firstly, in step 70, the computer device 12 scans the input interface 120 to determine whether there are any interface formatted data transferred from the information converting circuit 10 (step 72). If there are interface formatted data transferred from the information converting circuit 10, the receiving and displaying unit 124 waits for an event triggering signal (step 74). In step 76, a conclusion is made as to whether the event triggering signal is received. The event triggering signals may be control codes generated by the debugging control unit 1406, or input commands entered via an input terminal by a user. If the event triggering signal is received, the receiving and displaying unit 124 performs a corresponding event (step 78). The event can be receiving, storing, cleaning, or stop receiving information.

Figure 8:
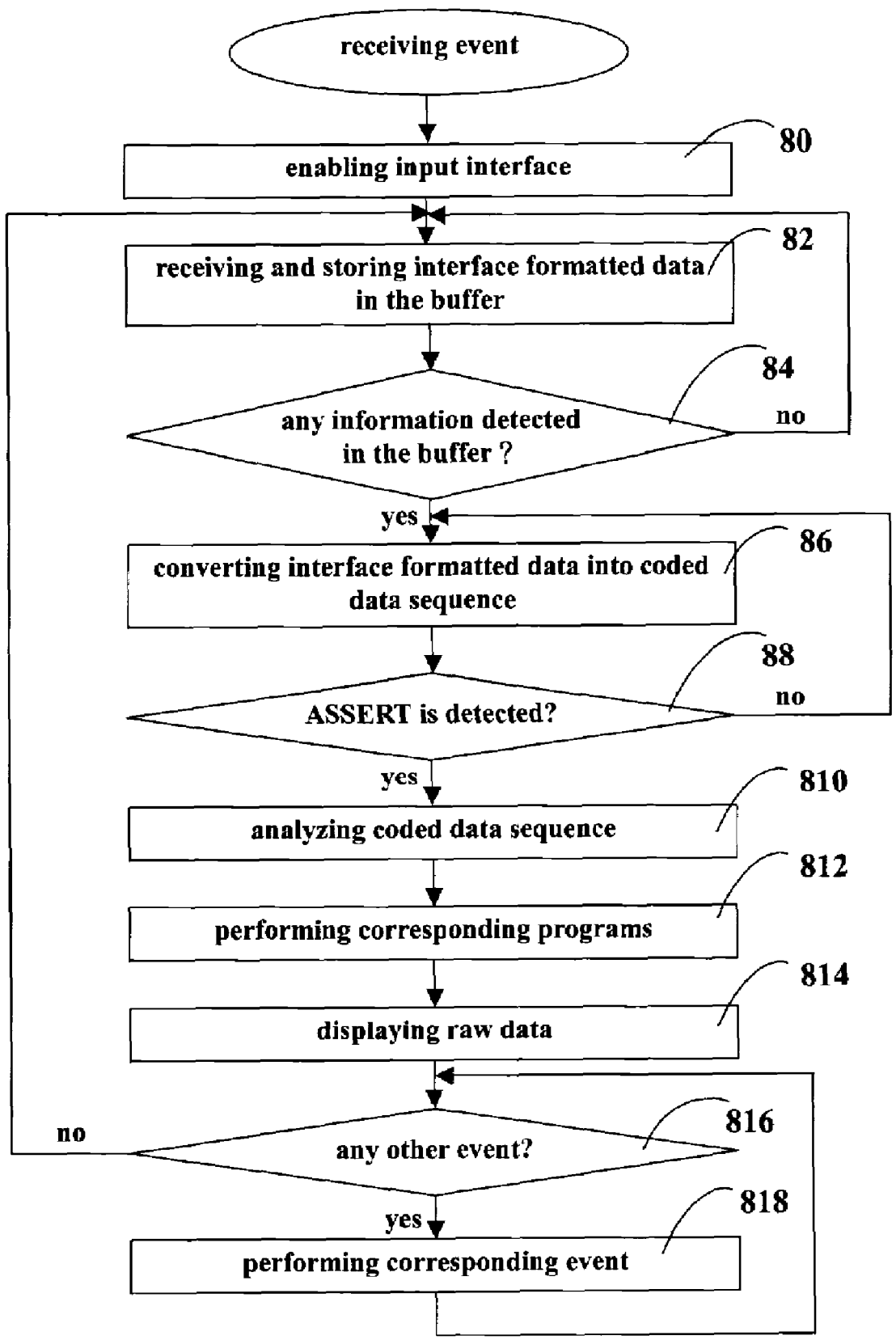
FIG. 8 is a detailed flow chart illustrating information receiving procedure of the computer device of FIG. 1.

Referring to FIG. 8, a detailed flow chart illustrates information receiving procedure of the computer device 12. Firstly, in step 80, the input interface 120 is enabled to receive information from the information converting circuit 10. Secondly, in step 82, the input interface 120 receives the interface formatted data and then stores the interface formatted data in the input buffer 1200. In step 84, the second converting unit 122 determines whether there are interface formatted data stored in the input buffer 1200. If there are interface formatted data stored in the input buffer 1200, the second converting unit 122 retransforms the interface formatted data back to the coded data sequence (step 86). The receiving and displaying unit 124 analyzes the coded data sequence to make a conclusion as to whether the first synchronous signal ASSERT is detected (step 88). If the first synchronous signal ASSERT is detected, the receiving and displaying unit 124 analyzes the coded data sequence (step 810). Based on the functional codes included in the coded data sequence, the receiving and displaying unit 124 invokes corresponding programs 1240 to read the textual message of the raw data from the database 126, so as to decode the coded data sequence to the raw data (step 812). In step 814, the decoded raw data is displayed via a display terminal. In step 816, another conclusion is made as to whether another event triggering signal is received. If there is no event triggering signal received, the procedure goes back to step 82. If another event triggering signal is received, in step 818, the computer device 12 performs the corresponding event, such as storing or cleaning the raw data, or stop receiving the interface formatted data from the information converting circuit 10.

The exemplary debugging apparatus 1 converts the raw data captured from the information storage apparatus 14 into the functional codes and the database codes that are in a simpler structure. The data to be transferred from the information storage apparatus 14 and the debugging apparatus 1 are reduced. Therefore, the debugging apparatus 1 can be used for debugging the information storage apparatus 14 that runs in a high speed. Furthermore, the information converting circuit 10 is a CPLD, thus can be configured to conform to any communicating interfaces.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. A debugging apparatus for debugging an information storage apparatus, comprising:
   a debugging control unit for capturing raw data and generating a coded data sequence representing the raw data;
   an information converting circuit for receiving the coded data sequence and transforming the coded data sequence into a predetermined format; and
   a computer device connected to the information converting circuit, for receiving the coded data sequence in the predetermined format and decoding the coded data sequence to the raw data.

2. The debugging apparatus as claimed in claim 1, wherein the coded data sequence comprises functional codes representing a category of the raw data and database codes representing a textual message of the raw data.

3. The debugging apparatus as claimed in claim 2, wherein the computer device comprises a database for storing relationships between the database code and the textual message of the raw data.

4. The debugging apparatus as claimed in claim 1, wherein the debugging control unit is arranged inside the information storage apparatus.

5. The debugging apparatus as claimed in claim 1, wherein the information converting circuit is connected to the information storage apparatus via an interface of the information storage apparatus, the interface employing I/O pins of the information storage apparatus.

6. The debugging apparatus as claimed in claim 1, wherein the information converting circuit is connected to the information storage apparatus via an interface of the information storage apparatus, the interface employing an internal interface based on which integrated circuits inside the information storage apparatus communicate with each other.

7. The debugging apparatus as claimed in claim 1, wherein the information converting circuit is a complex programmable logic device.

8. The debugging apparatus as claimed in claim 1, wherein the information converting circuit comprises a first interface connected to the information storage apparatus, a second interface connected to the computer device, a protocol converting unit for formatting the coded data sequence into a second predetermined format, and an interface converting unit for transforming the coded data sequence in the second predetermined format into an interface formatted data transmittable by the second interface.

9. A debugging method for debugging an information storage apparatus, comprising:
   capturing raw data from the information storage apparatus;

generating a coded data sequence including functional codes representing a category of the raw data and database codes representing a textual message of the raw data;

transmitting the coded data sequence to a computer device; and decoding the coded data sequence to the raw data via the computer device.

10. The debugging method as claimed in claim 9, further comprising a step of recording relationships between the database code and the textual message of the raw data into a database.

11. The debugging method as claimed in claim 9, further comprising a step of transforming the coded data sequence into a predetermined format transmittable to the computer device via an information converting circuit.

12. The debugging method as claimed in claim 11, wherein the information converting circuit is a complex programmable logic device.

13. The debugging method as claimed in claim 11, further comprising a step of connecting the information converting circuit to the information storage apparatus via an interface, the interface employing I/O pins of the information storage apparatus.

14. The debugging method as claimed in claim 11, further comprising a step of connecting the information converting circuit to the information storage apparatus via an interface, the interface employing an internal interface based on which integrated circuits inside the information storage apparatus communicate with each other.

15. The debugging method as claimed in claim 11, further comprising a step of generating a synchronous signal to control a start of data transfer from the information storage apparatus to the information converting circuit.

16. The debugging method as claimed in claim 9, further comprising a step of classifying the raw data into a plurality of categories based on functions of the raw data.

* * * * *